(12) United States Patent
Mian et al.

(10) Patent No.: US 8,150,105 B2
(45) Date of Patent: Apr. 3, 2012

(54) INSPECTION USING THREE-DIMENSIONAL PROFILE INFORMATION

(75) Inventors: Zahid F. Mian, Loudonville, NY (US); Robert W. Foss, Cohoes, NY (US)

(73) Assignee: International Electronic Machines Corporation, Troy, NY (US)

( * ) Notice: Subject to any disclaimer, the term of this patent is extended or adjusted under 35 U.S.C. 154(b) by 294 days.

(21) Appl. No.: 12/470,510

(22) Filed: May 22, 2009

(65) Prior Publication Data

US 2009/0290757 A1    Nov. 26, 2009

Related U.S. Application Data

(60) Provisional application No. 61/071,864, filed on May 22, 2008.

(51) Int. Cl.
*G06K 9/00* (2006.01)
(52) U.S. Cl. ......... 382/104; 382/141; 382/145; 382/154
(58) Field of Classification Search .................. 382/131, 382/141, 145, 154, 149, 285–287, 291, 104, 382/106; 356/237.1–237.5, 601–602, 614, 356/623, 625, 640; 348/148, 135, 113, 116
See application file for complete search history.

(56) References Cited

U.S. PATENT DOCUMENTS

| | | | |
|---|---|---|---|
| 5,636,026 A | 6/1997 | Mian et al. | |
| 5,646,679 A * | 7/1997 | Yano et al. | 348/47 |
| 6,173,070 B1 * | 1/2001 | Michael et al. | 382/145 |
| 6,477,260 B1 * | 11/2002 | Shimomura | 382/106 |
| 6,768,551 B2 | 7/2004 | Mian et al. | |
| 6,804,683 B1 * | 10/2004 | Matsuzaki et al. | 1/1 |
| 6,856,344 B2 | 2/2005 | Franz | |
| 7,034,272 B1 * | 4/2006 | Leonard et al. | 250/208.1 |
| 7,092,563 B2 * | 8/2006 | Shiratani | 382/154 |
| 7,176,959 B2 * | 2/2007 | Sato et al. | 348/148 |
| 7,315,321 B2 | 1/2008 | Polyakov | |
| 7,349,007 B2 | 3/2008 | Millar | |
| 7,349,104 B2 * | 3/2008 | Geng | 356/603 |
| 7,620,209 B2 * | 11/2009 | Stevick et al. | 382/106 |
| 2004/0184638 A1 * | 9/2004 | Nobori et al. | 382/104 |
| 2005/0267707 A1 | 12/2005 | Mian et al. | |
| 2005/0270537 A1 | 12/2005 | Mian et al. | |
| 2009/0018721 A1 | 1/2009 | Mian et al. | |

OTHER PUBLICATIONS

Gatekeeper Entry Control Point System Product Specifications, Gatekeeper Inc., date unknown, 2 pages.
IVSS Product Description Brochure, Teleradio Engineering Pte Ltd., date unknown, 1 page.

* cited by examiner

*Primary Examiner* — Sang Nguyen
(74) *Attorney, Agent, or Firm* — John W. LaBatt; Hoffman Warnick LLC

(57) ABSTRACT

A three-dimensional profile of at least a portion of an object, such as a vehicle, is generated using image data corresponding to the object. The image data can be acquired as the object passes an inspection location and can be enhanced using emitted electromagnetic radiation or the like. The three-dimensional profile is analyzed to identify any anomalies that are associated with the object. The analysis can include comparing the three-dimensional profile to a standard three-dimensional profile corresponding to a type of the object. Further, the analysis can include comparing the three-dimensional profile to a previously acquired three-dimensional profile for the object. The three-dimensional profile can be generated using visible light-based image data, and one or more additional profiles based on non-visible data also can be generated and analyzed.

20 Claims, 7 Drawing Sheets

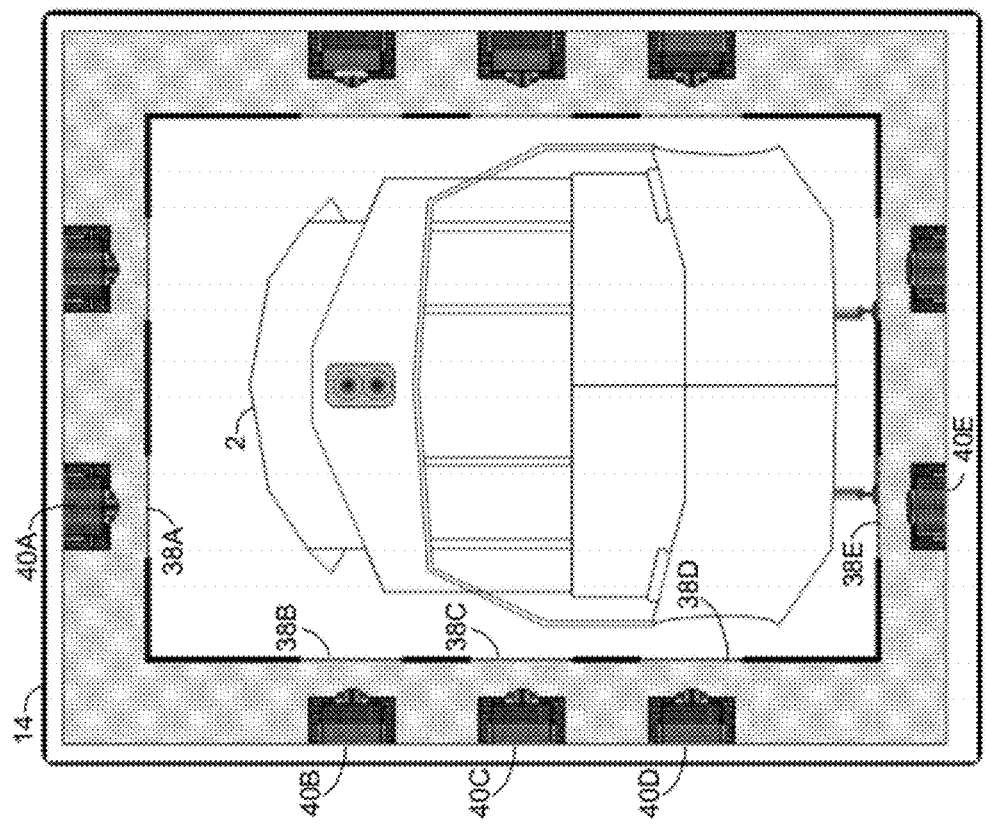
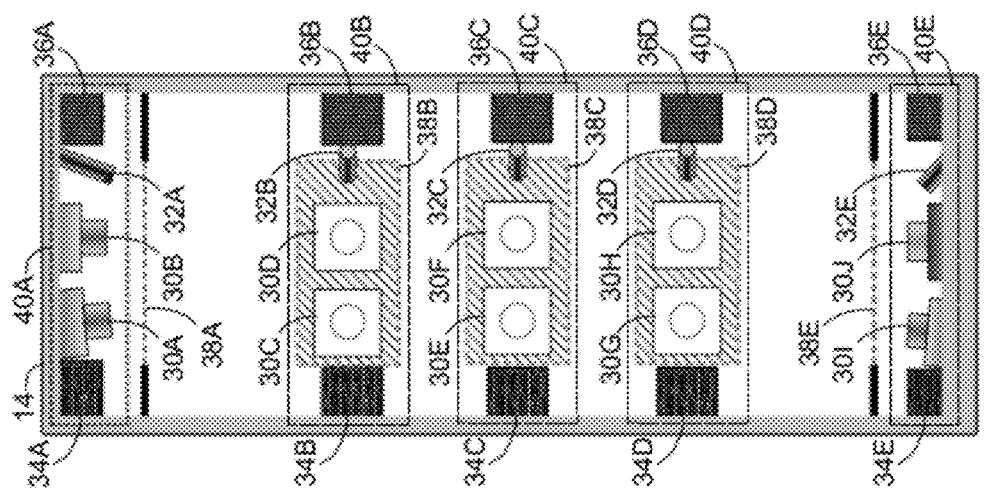

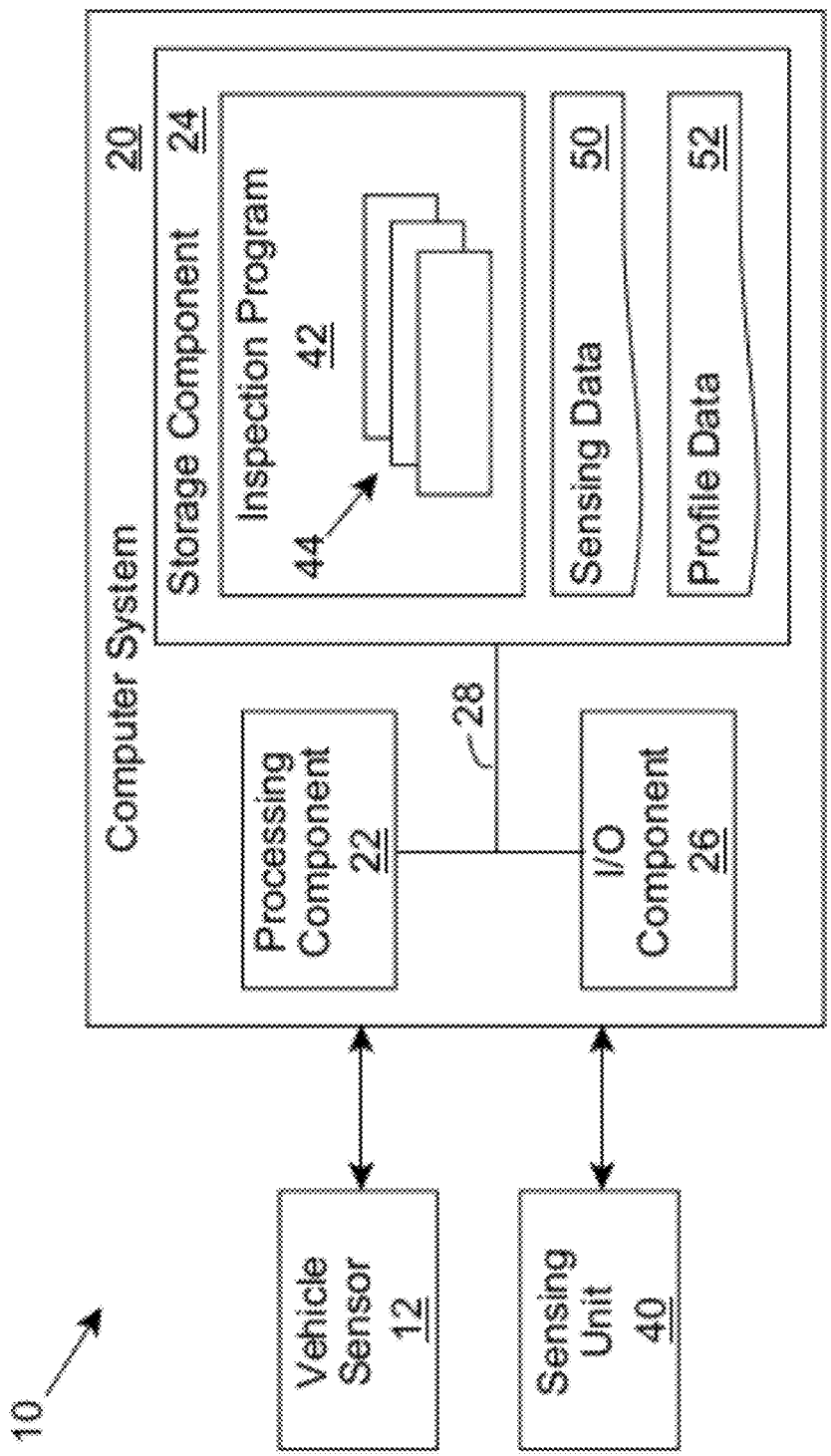

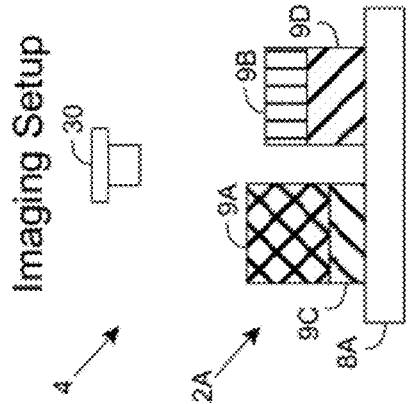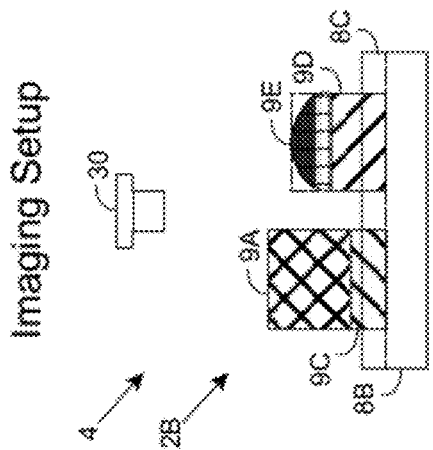
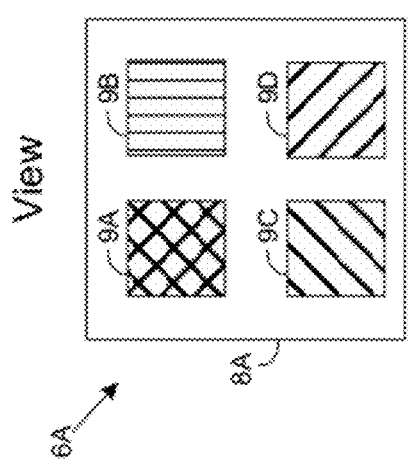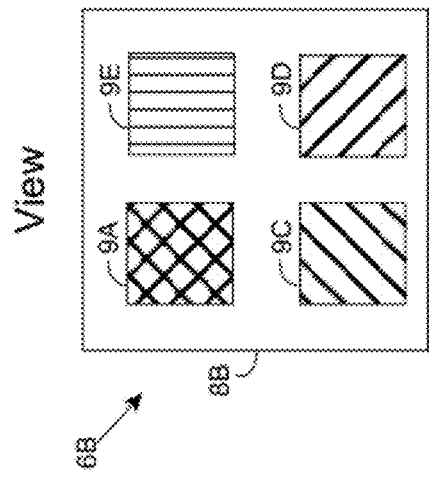
FIG. 4A PRIOR ART
FIG. 4B PRIOR ART

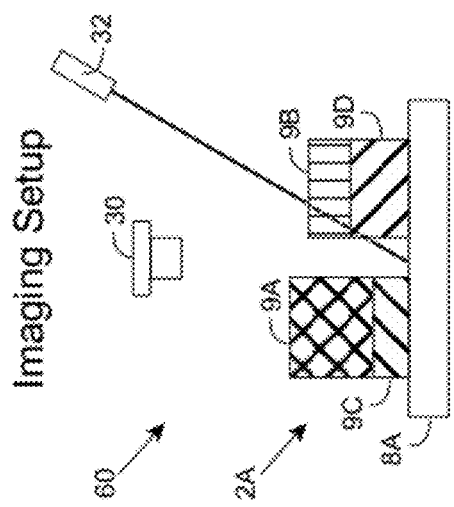
FIG. 5A
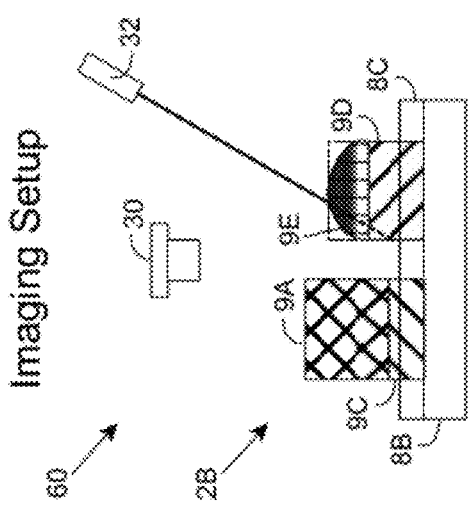
FIG. 5B
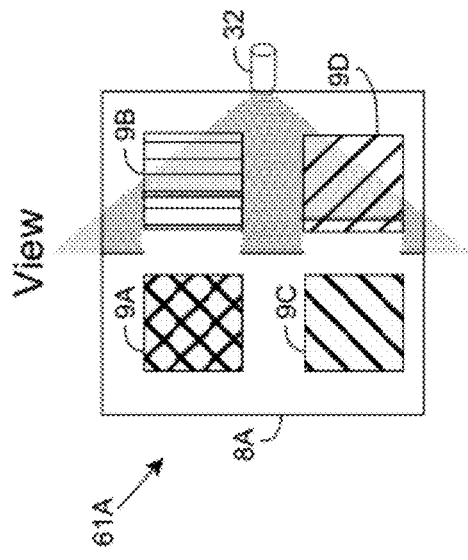
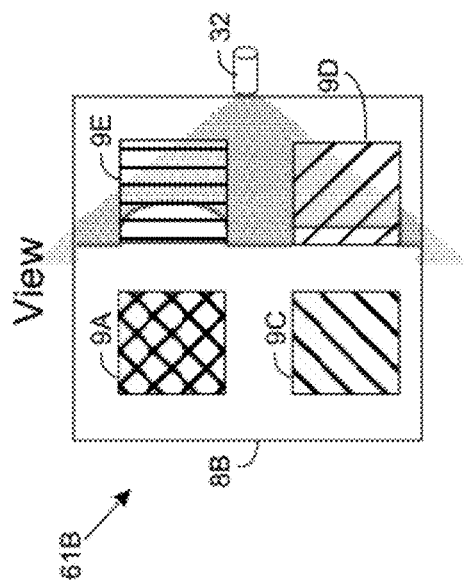

INSPECTION USING THREE-DIMENSIONAL PROFILE INFORMATION

REFERENCE TO PRIOR APPLICATIONS

The current application claims the benefit of U.S. Provisional Application No. 61/071,864, titled "Intelligent automated entry screening device", which was filed on 22 May 2008, and which is hereby incorporated by reference.

TECHNICAL FIELD

The disclosure relates generally to inspecting an object, such as a vehicle, and more particularly, to generating profile information for the object and using the profile information in the inspection.

BACKGROUND ART

Maintaining security is a constant concern for numerous installations including military installations, government installations, international borders, civilian installations, and the like. In an installation having high traffic, e.g., many vehicles including automobiles, trains, trucks, and/or the like moving in and out during the course of a typical day, a significant concern is whether one or more of these vehicles is being used to transport contraband, such as explosive devices, weapons, smuggled individuals, and/or the like.

Currently, at high-security installations, a visual inspection for potential threats is performed on incoming (or exiting) vehicles. For the most part, this inspection is done by humans equipped with small cameras and/or mirrors to inspect the undercarriage of the vehicle. However, some visual inspections utilize remotely operated vehicles (ROVs). In either case, the visual inspection is time-consuming work and exposes the inspector to grave danger when a vehicle being used to transport contraband attempts to enter (or exit) the installation. Some commercial systems seek to automate aspects of the visual inspection of vehicles. These systems require slow-speed entry/exit, almost entirely rely on the use of visible light, and often require a large, unwieldy speed-bump configuration and/or an entire separate structure to perform the inspection. Further, many approaches continue to rely completely on human perceptions, with several current commercial inspection systems providing little or no "smart" video performance, which at most, enhances the view for human inspection.

However, human inspectors have to be trained and tend to become habituated to their setting, which often reduces their vigilance, and the likelihood of spotting a particular potential problem, over time. Also, given the wide range of different vehicle designs, even in reasonably standardized industries such as railroad cars, it becomes difficult for an inspector to reliably say that something they see in a mirror or in an undercarriage view is actually an anomaly. If an inspector is too cautious, many vehicles are stopped for no purpose, holding up the flow of traffic. However, if the inspector is too lenient, contraband may enter/exit the installation unchallenged, which can prove disastrous.

To date, all of the few known commercial systems providing some "intelligent" or "smart" video analysis, only analyze visible-light images for differences and/or specific shapes. However, the lack of three-dimensional profile information on the vehicle renders these systems, similar to the individuals viewing the images, readily deceived by camouflage, e.g., matching the color and texture of the perceived exterior to the expected color and texture.

Sensor and/or data fusion is the combination (fusing) of information across time, space and/or modalities, which can be analyzed to obtain various types of information. For example, the passage of an object can be detected by noting an amount of light reaching a sensor was a relatively high level, abruptly went low, then returned to a high level (data fusion across time). The passage can be correlated with another event, such as the arrival of another object, by noting the same pattern occurring at another similar sensor located elsewhere (data fusion across space). Further, the object can be identified as a motor vehicle by noting that the passage was coincident with the identification of a motor vehicle based on acoustic data acquired by a co-located acoustic sensor (data fusion across different sensor modalities).

SUMMARY OF THE INVENTION

Aspects of the invention provide a solution for inspecting an object by generating a three-dimensional profile of at least a portion of the object, such as a vehicle, using image data corresponding to the object. The image data can be acquired as the object passes an inspection location and can be enhanced using emitted electromagnetic radiation or the like. The three-dimensional profile is analyzed to identify any anomalies that are associated with the object. The analysis can include comparing the three-dimensional profile to a standard three-dimensional profile corresponding to a type of the object. Further, the analysis can include comparing the three-dimensional profile to a previously acquired three-dimensional profile for the object. The three-dimensional profile can be generated using visible light-based image data, and one or more additional profiles based on non-visible data also can be generated and analyzed.

A first aspect of the invention provides a computer-implemented method of inspecting a vehicle, the method comprising: acquiring image data for the vehicle using a set of imaging devices; generating a three-dimensional profile of at least one side of the vehicle based on the image data using at least one computing device; and analyzing the three-dimensional profile to identify any anomalies associated with the vehicle using the at least one computing device, the analyzing including comparing the three-dimensional profile to at least one of: a standard three-dimensional profile corresponding to a type of the vehicle or a previous three-dimensional profile acquired for the vehicle; and initiating an action in response to identifying an anomaly associated with the vehicle using the at least one computing device.

A second aspect of the invention provides a system for inspecting an object, the system comprising: a set of imaging devices, each imaging device configured to acquire image data for the object as the object passes; and a computer system including at least one computing device in communication with each imaging device, the at least one computing device including: a component configured to generate a three-dimensional profile of at least one side of the object using the image data; a component configured to analyze the three-dimensional profile to identify any anomalies associated with the object, the analyzing including comparing the three-dimensional profile to a standard three-dimensional profile corresponding to a type of the object; and a component configured to initiate an action in response to identification of an anomaly associated with the vehicle.

A third aspect of the invention provides a system for inspecting an object, the system comprising: a computer system including at least one computing device including: a component configured to generate a three-dimensional profile of at least one side of the object using image data corresponding to the object; and a component configured to analyze the three-dimensional profile to identify any anomalies associated with the object, the analyzing including comparing the three-dimensional profile to a standard three-dimensional profile corresponding to a type of the object.

Other aspects of the invention provide methods, systems, program products, and methods of using and generating each, which include and/or implement some or all of the actions described herein. The illustrative aspects of the invention are designed to solve one or more of the problems herein described and/or one or more other problems not discussed.

BRIEF DESCRIPTION OF THE DRAWINGS

These and other features of the disclosure will be more readily understood from the following detailed description of the various aspects of the invention taken in conjunction with the accompanying drawings that depict various aspects of the invention.

FIGS. 2A-2B show side and front views, respectively, of an illustrative implementation of a sensing assembly according to an embodiment.

FIG. 3 shows an illustrative implementation of the computer system of FIG. 1 according to an embodiment.

FIGS. 4A-4B show an illustrative imaging setup and corresponding views for acquiring visible light-based images of two different assemblies according to the prior art.

FIGS. 5A-5B show an illustrative imaging setup and corresponding views for profiling and acquiring visible light-based images of two different assemblies according to an embodiment.

It is noted that the drawings may not be to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

As indicated above, aspects of the invention provide a solution for inspecting an object by generating a three-dimensional profile of at least a portion of the object, such as a vehicle, using image data corresponding to the object. The image data can be acquired as the object passes an inspection location and can be enhanced using emitted electromagnetic radiation or the like. The three-dimensional profile is analyzed to identify any anomalies that are associated with the object. The analysis can include comparing the three-dimensional profile to a standard three-dimensional profile corresponding to a type of the object. Further, the analysis can include comparing the three-dimensional profile to a previously acquired three-dimensional profile for the object. The three-dimensional profile can be generated using visible light-based image data, and one or more additional profiles based on non-visible data also can be generated and analyzed. As used herein, unless otherwise noted, the term "set" means one or more (i.e., at least one) and the phrase "any solution" means any now known or later developed solution.

Further details of illustrative aspects of the invention are shown and described with reference to an embodiment of the invention configured to assure safety and security in a location, such as a military base, which is often entered by various vehicles. In this case, aspects of the invention can examine the vehicles entering the location for the presence of explosives or other contraband (objects and/or individuals) in a manner that does not expose security personnel to additional danger during the inspection process. The inspection process can include generating a three-dimensional profile of at least a portion of the vehicle and analyzing the profile and/or corresponding image data for the presence of shapes, outlines, elevation profiles, and/or other characteristics that may indicate the presence of contraband. The inspection process also can detect safety-related phenomena with respect to a vehicle, such as the presence of one or more failing systems. An embodiment of the invention uses sensor/data fusion to increase the detection capabilities of the system.

Figure 1:
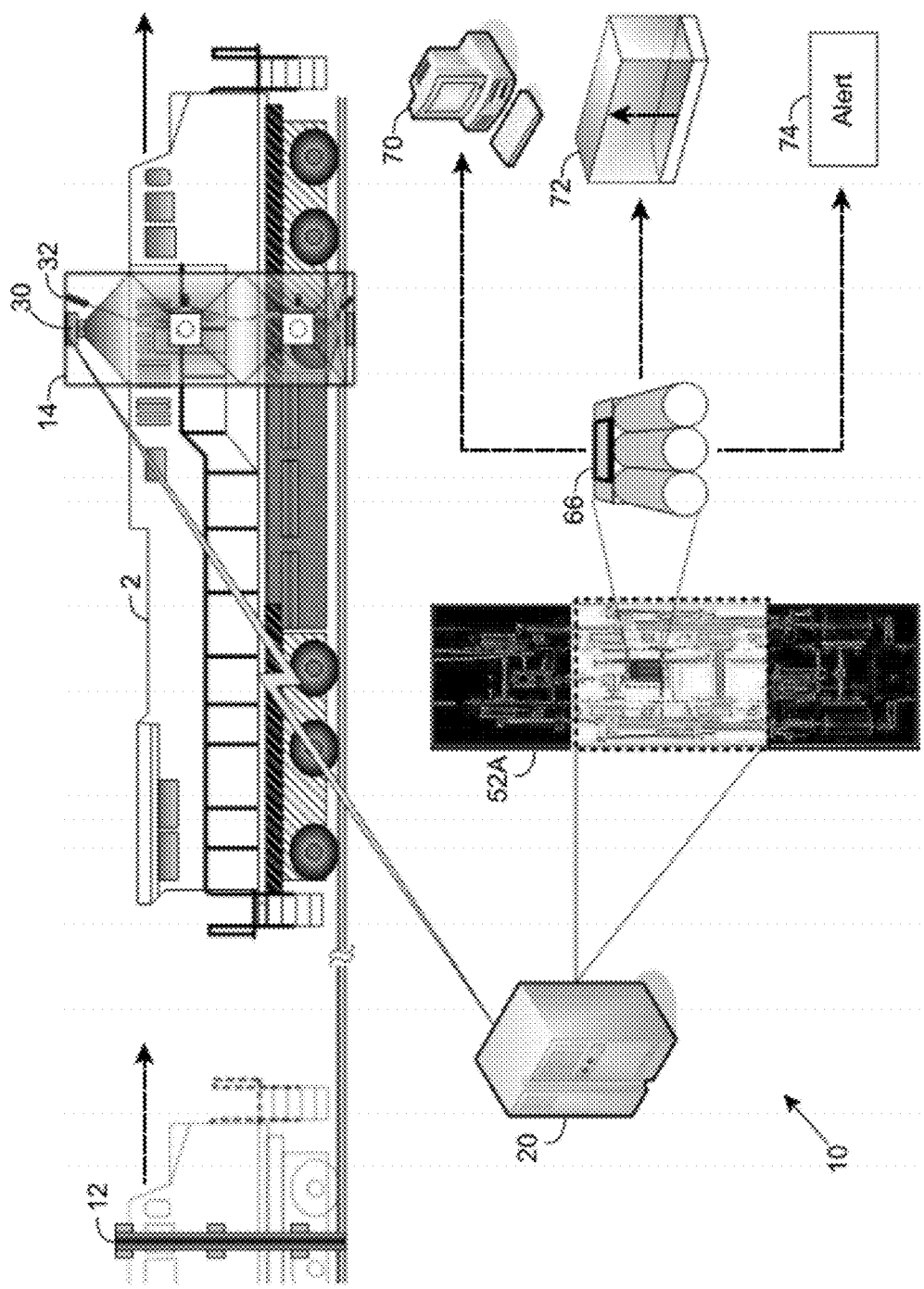
FIG. 1 shows an illustrative environment for inspecting a vehicle according to an embodiment.

Turning to the drawings, FIG. 1 shows an illustrative system 10 for inspecting a vehicle 2 according to an embodiment. System 10 is configured to detect and inspect a rail vehicle, such as a locomotive 2, while it is traveling from left to right along a set of rails. However, it is understood that the invention is not limited to the inspection of rail vehicles and trains. To this extent, in other embodiments, vehicle 2 can comprise a passenger car, a truck, a bus, or any other wheeled motor vehicle, a boat, or any other waterborne vehicle, and/or the like. Regardless, system 10 can include: a vehicle sensor 12, which is configured to detect the vehicle 2 as it passes from left to right; a sensing assembly 14, which is configured to acquire vehicle data with respect to vehicle 2 as it passes there through; and a computer system 20, which is configured to perform a process described herein in order to inspect the vehicle 2 using the vehicle data.

Components of sensing assembly 14 can be shut down/placed on standby during periods of non-use. To this extent, vehicle sensor 12 can be configured to detect vehicle 2 in sufficient time to enable initialization of the various components of sensing assembly 14 prior to the arrival of vehicle 2. In an embodiment, vehicle 2 can pass through system 10 at a variety of speeds that would be considered normal operating speeds in the setting in which system 10 is installed. For example, system 10 can be configured to accommodate vehicles 2 traveling at speeds up to approximately seventy-five miles per hour. Regardless, a corresponding distance between vehicle sensor 12 and sensing assembly 14 can be selected based on the maximum accommodated speed as well as an amount of time required to initialize the components of sensing assembly 14 using any solution.

Vehicle sensor 12 can comprise any type of sensor for sensing a passing vehicle 2. For example, vehicle sensor 12 can comprise a pressure sensor, a magnetic sensor, a video camera with associated processing (e.g., performed by computer system 20), a radar or sonar based movement detector, and/or the like. In addition to detecting a passing vehicle 2, vehicle sensor 12 can be configured to acquire one or more attributes of the passing vehicle 2, such as a speed of vehicle 2, a length of vehicle 2 (e.g., using timing and speed information), and/or the like. Further, a second vehicle sensor could be located within or adjacent to sensing assembly 14 to acquire a set of attributes of the passing vehicle 2. Computer system 20 and/or a processing component of sensing assembly 14 can use these attributes to configure the operation sensing assembly 14 to ensure, for example, an appropriate imaging speed (e.g., sufficiently fast frames per second) is used, to indicate an end of the vehicle 2 to ensure that the data collected by sensing assembly 14 is associated with the proper vehicle 2, and/or the like.

In any event, vehicle 2 passes through/past sensing assembly 14. Sensing assembly 14 includes a set of sensing devices, such as sensing device 30, configured to acquire sensing data corresponding to vehicle 2, and can include a set of emitters, such as emitter 32. In an embodiment, sensing assembly 14 can include a set of emitters that includes one or more lasers and the set of sensing devices 30 can comprise one or more imaging devices that are sensitive to the reflected wavelengths of the corresponding emitter(s) 32. However, it is understood that sensing assembly 14 can comprise any combination of one or more sensing device(s) 30 configured to operate using any combination of one or more sensing modalities, with or without corresponding emitter(s) 32. For example, sensing assembly 14 can include a speaker (emitter) configured to emit acoustic (sound) waves that are reflected off of vehicle 2, and a microphone array (sensing device) configured to receive the reflections (echoes) and transform the reflections received into sensing data. Further, sensing assembly 14 can include a set of infrared imaging devices, which can capture infrared-based images of vehicle 2.

The various sensing devices 30 in sensing assembly 14 can acquire the sensing data and transfer the sensing data, or pre-processed sensing data derived therefrom, to computer system 20 for further processing using any solution. A sensing device 30 and/or a processing device of sensing assembly 14 associated therewith can transmit the sensing data as it is received (e.g., in real time) and/or store some or all of the sensing data for later transmission to computer system 20. Further, a sensing device 30 or an associated processing device can perform pre-processing of the raw sensing data prior to transmission to computer system 20.

FIGS. 2A-2B show side and front views, respectively, of an illustrative implementation of a sensing assembly 14 according to an embodiment. Sensing assembly 14 is shown including a plurality of sensing devices 30A-30J and a plurality of emitters 32A-32E. As discussed herein, each sensing device 30A-30J is configured to acquire sensing data corresponding to a vehicle 2 as it passes. Each emitter 32A-32E can generate electromagnetic radiation, sound, or the like, which can be detected by a corresponding one or more of the sensing devices 30A-30J.

Additionally, sensing assembly 14 includes a plurality of data processing components 34A-E. While shown as separate components, it is understood that data processing components 34A-E could be integrated into one or more other components, such as sensing devices 30A-30J (e.g., smart visible or infrared cameras). Regardless, each data processing component 34A-E can perform one or more pre-processing functions on sensing data acquired by a corresponding set of sensing devices 30A-30J, including, but not limited to, inherent calibration, noise filtering and reduction, image/data enhancement, initial data analysis, compression, encoding, and/or the like.

Further, sensing assembly 14 includes a plurality of support electronics 36A-36E. The support electronics 36A-36E can implement various functions, including, but not limited to: activating/deactivating sensing devices 30A-30J, emitters 32A-32E, and/or processing components 34A-34E; providing power to other devices in sensing assembly 14; sensing faults in one or more components; initiating action(s) in response to a fault; and/or the like. To this extent, support electronics 36A-36E can include a computing device, a power source, one or more sensors, and/or the like. Additionally, sensing assembly 14 can include various environmental protective components, which support electronics 36A-36E (e.g., a computing device included therein) can be configured to control. For example, sensing assembly 14 is shown including shutters 38A-38E, which support electronics 36A-36E can operate to open shortly before a vehicle 2 passes sensing assembly 14 and close shortly after a vehicle 2 has passed sensing assembly 14 with no other vehicle 2 detected as approaching.

Sensing assembly 14 can be configured to include multiple sensing units 40A-40E, each of which is configured to operate independently of other sensing units 40A-40E. For example, sensing unit 40A is shown including sensing devices 30A, 30B, emitter 32A, processing component 34A, and support electronics 36A. It is understood that the configuration of sensing unit 40A is only illustrative, and each sensing unit 40A-40E can include any combination of various sensing device(s), emitter(s), processing component(s), and/or the like. Further, it is understood that sensing assembly 14 includes various structural components configured to locate the one or more sensing units 40A-40E in various locations relative to a vehicle 2 with sufficient strength to withstand various forces experienced in the operating environment. Additionally, sensing assembly 14 can include wiring for providing power and/or data transmission for the components/devices in each sensing unit 40A-40E using any solution. Still further, sensing assembly 14 can include ducts and/or vents, which can enable air to be circulated through sensing assembly 14. The air can produce an air curtain, which impedes the entry of water, dust, and other unwanted substances during sensing. Further, the air can control the temperature and/or humidity of the environment surrounding the various components located within sensing assembly 14.

Returning to FIG. 1, computer system 20 is configured to receive sensing data acquired at vehicle sensor 12 and/or sensing assembly 14, and analyze the sensing data to inspect a vehicle 2. Further, computer system 20 can be configured to control the operation of vehicle sensor 12 and/or one or more components located at sensing assembly 14. To this extent, FIG. 3 shows an illustrative implementation of computer system 20 according to an embodiment. In this embodiment, computer system 20 is shown including an inspection program 42, which makes computer system 20 operable to inspect a vehicle by performing a process described herein.

Computer system 20 is shown including a processing component 22 (e.g., one or more processors), a storage component 24 (e.g., a storage hierarchy), an input/output (I/O) component 26 (e.g., one or more I/O interfaces and/or devices), and a communications pathway 28. In general, processing component 22 executes program code, such as inspection program 42, which is at least partially fixed in storage component 24. While executing program code, processing component 22 can process data, which can result in reading and/or writing transformed data from/to storage component 24 and/or I/O component 26 for further processing. Pathway 28 provides a communications link between each of the components in computer system 20. I/O component 26 can comprise one or more human I/O devices, which enable a human user to interact with computer system 20 and/or one or more communications devices to enable a system user to communicate with computer system 20 using any type of communications link. To this extent, inspection program 42 can manage a set of interfaces (e.g., graphical user interface(s), application program interface, and/or the like) that enable human and/or system users to interact with inspection program 42. Further, inspection program 42 can manage (e.g., store, retrieve, create, manipulate, organize, present, etc.) the data, such as sensing data 50 and profile data 52, using any solution.

In any event, computer system 20 can comprise one or more general purpose computing articles of manufacture (e.g., computing devices) capable of executing program code, such as inspection program 42, installed thereon. As used herein, it is understood that "program code" means any collection of instructions, in any language, code or notation, that cause a computing device having an information processing capability to perform a particular function either directly or after any combination of the following: (a) conversion to another language, code or notation; (b) reproduction in a different material form; and/or (c) decompression. To this extent, inspection program 42 can be embodied as any combination of system software and/or application software.

Further, inspection program 42 can be implemented using a set of modules 44. In this case, a module 44 can enable computer system 20 to perform a set of tasks used by inspection program 42, and can be separately developed and/or implemented apart from other portions of inspection program 42. As used herein, the term "component" means any configuration of hardware, with or without software, which implements the functionality described in conjunction therewith using any solution, while the term "module" means program code that enables a computer system 20 to implement the functionality described in conjunction therewith using any solution. When fixed in a storage component 24 of a computer system 20 that includes a processing component 22, a module is a substantial portion of a component that implements the functionality. Regardless, it is understood that two or more components, modules, and/or systems may share some/all of their respective hardware and/or software. Further, it is understood that some of the functionality discussed herein may not be implemented or additional functionality may be included as part of computer system 20.

When computer system 20 comprises multiple computing devices, each computing device can have only a portion of inspection program 42 fixed thereon (e.g., one or more modules 44). However, it is understood that computer system 20 and inspection program 42 are only representative of various possible equivalent computer systems that may perform a process described herein. To this extent, in other embodiments, the functionality provided by computer system 20 and inspection program 42 can be at least partially implemented by one or more computing devices that include any combination of general and/or specific purpose hardware with or without program code. In each embodiment, the hardware and program code, if included, can be created using standard engineering and programming techniques, respectively.

Regardless, when computer system 20 includes multiple computing devices, the computing devices can communicate over any type of communications link. Further, while performing a process described herein, computer system 20 can communicate with one or more other computer systems using any type of communications link. In either case, the communications link can comprise any combination of various types of wired and/or wireless links; comprise any combination of one or more types of networks; and/or utilize any combination of various types of transmission techniques and protocols.

As discussed herein, inspection program 42 enables computer system 20 to perform an inspection of a vehicle 2 (FIG. 1). To this extent, computer system 20 can receive an indication of an approaching vehicle 2 from a vehicle sensor 12. In response, computer system 20 can signal one or more sensing units 40 to activate the corresponding sensing device(s) and emitter(s), if any, to acquire sensing data 50 corresponding to the vehicle 2. As the vehicle 2 passes the sensing unit 40, the sensing device(s) acquire the sensing data 50, which is preprocessed and/or provided for further processing by computer system 20. Additionally, vehicle sensor 12 can provide sensing data 50 for processing by computer system 20. Regardless, sensing data 50 comprises data representing one or more physical attributes of the vehicle 2.

In an embodiment, computer system 20 can transform at least a portion of sensing data 50 into profile data 52 for at least a portion of vehicle 2. Profile data 52 can include a three-dimensional profile for substantially all of at least one side of vehicle 2. Sensing data 50 can comprise image data corresponding to the portion(s) of the vehicle 2, and computer system 20 can generate the three-dimensional profile corresponding to vehicle 2 using the image data. Sensing unit 40 can include one or more emitters that are configured to enhance various features of the portion(s) of vehicle 2 to be profiled in the image data, which enables computer system 20 to perform a more effective analysis of the sensing data 50.

To this extent, FIGS. 4A-4B show an illustrative imaging setup 4 and corresponding views 6A, 6B for acquiring visible light-based images of two different assemblies 2A, 2B, respectively, according to the prior art. For example, the assemblies 2A, 2B can comprise the undercarriage of a vehicle 2 (FIG. 1). Assembly 2A can comprise a standard assembly for the vehicle 2, which includes a base 8A, and various components 9A-9D disposed thereon. Assembly 2B can comprise a modified assembly for the vehicle 2, which is made to appear similar to assembly 2A. However, modified assembly includes a base 8B that is thicker than the standard base 8A, a component 9E having a domed top with a square base, and standard components 9A, 9C, 9D. Base 8B and component 9E can comprise a surface texture and color that are identical to the standard base 8A and component 9B, respectively. The added thickness of base 8B can comprise a concealed compartment 8C, which can be used for transporting contraband.

Camera 30 is configured to image assemblies 2A, 2B. As illustrated in the respective views 6A-6B, the resulting images of assemblies 2A, 2B will look substantially similar. In analyzing the images, the difference in the sizes of bases 8A, 8B (due to base 8B extending closer to camera 30) in the respective views 6A-6B may be mistakenly attributed to natural variance in the imaging and analysis process rather than due to the presence of a compartment 8C. As a result, using imaging setup 4, the modified base 8B and component 9E may escape detection by an inspection utilizing imaging setup 4.

As discussed herein, an embodiment of the invention generates a three-dimensional profile of at least a portion of a target object, such as a vehicle 2, using image data in which one or more features of the target object have been enhanced. To this extent, FIGS. 5A-5B show an illustrative imaging setup 60 and corresponding views 61A, 61B for profiling and acquiring visible light-based images of the assemblies 2A, 2B, respectively, according to an embodiment. As in FIGS. 4A-4B, assembly 2A comprises a base 8A and components 9A-9D disposed thereon, while assembly 2B has been modified to look like assembly 2A, but include a thicker base 8B with a concealed compartment 8C and a different component 9E in place of component 9B. However, in addition to camera 30, imaging setup 60 includes a laser 32 configured to project a sheet of laser light across assemblies 2A, 2B as they move through the view of camera 30. Laser 32 is configured to project the sheet of laser light at an angle with respect to camera 30, and thereby intersects assemblies 2A, 2B at various locations within views 61A, 61B. In an embodiment, laser 32 is configured to project the sheet of laser light at an angle between approximately 10-20 degrees with respect to the view of camera 30. However, it is understood that any acute angle permitting sufficient discrimination between the target distances can be utilized depending on the particular configuration and composition of the expected targets.

When imaging assemblies 2A, 2B with laser 32, multiple laser line segments will be visible within the respective views 61A, 61B. This results in clear differences between views 61A, 61B due to the modifications made to assembly 8B. In particular, line segments intersecting base 8B are shifted noticeably to the right due to the raised surface level of base 8B, while the line segment intersecting component 9D remains in approximately the same position. Further, the line segment intersecting component 9E is curved in contrast to the straight line segment that intersected the standard component 9B. To this extent, a comparison of views 61A, 61B will readily note the presence of modifications to assembly 8B.

Using imaging setup 60, camera 30 can acquire multiple images of each assembly 2A, 2B as they pass through the view. Further, a set of lasers 32 configured to generate multiple sheets of laser light can be used while camera 30 images assemblies 2A, 2B. Still further, the set of lasers 32 can be configured to generate sheets of laser light from different sides and/or angles with respect to camera 30. The sheets of laser light can be distinguished by color, by direction (e.g., substantially perpendicular sheets of laser light), and/or the like. Additionally, it is understood that the image data acquired by camera 30 is not limited to visible light-based image data, but may comprise image data in other spectra including, for example, infrared, ultraviolet, and/or the like, image data generated using radar, etc. Further, it is understood that the image data can comprise image data concurrently captured by multiple cameras (e.g., stereo imaging).

Regardless, each assembly 2A, 2B can correspond to an undercarriage of a particular vehicle during two different inspections of the vehicle. Referring to FIGS. 3 and 5A, 5B, computer system 20 can process the image data acquired by camera(s) 30 to create a three-dimensional profile model of each assembly 2A, 2B during each inspection. Computer system 20 can store the three-dimensional profile model as profile data 52 for the corresponding vehicle. Computer system 20 can compare the profile data 52 to expected profile data 52, which can include previously acquired profile data 52 and/or a standard (e.g., exemplar) three-dimensional profile corresponding to the type of vehicle to identify any anomalies associated with the vehicle.

For example, computer system 20 can generate a three-dimensional profile of each assembly 2A, 2B when the specific vehicle is inspected and store the profiles of assemblies 2A, 2B as profile data 52 corresponding to the particular vehicle. The particular vehicle can be uniquely identified from other vehicles using any solution, e.g., a license plate number, or the like. During each inspection, computer system 20 can compare the three-dimensional profile for the corresponding assembly 2A, 2B to a set of expected three-dimensional profiles stored in profile data 52. The set of expected three-dimensional profiles can include a standard profile corresponding to the type of vehicle, one or more profiles generated from other vehicles of the same type (e.g., a database of exemplary vehicles), a previously generated profile for the assembly 2A, 2B of the particular vehicle, and/or the like.

When the modified assembly 2B is inspected after assembly 2A, computer system 20 can compare the profile of assembly 2B to the profile of assembly 2A. In this case, computer system 20 can flag the differences in the two profiles based on the comparison. Further, computer system 20 can always compare a newly acquired profile of an assembly 2A, 2B, to a set of standard profiles for the corresponding vehicle type in order to determine whether the vehicle may have been modified prior to its first inspection. A standard profile can be generated based on multiple inspections of the same types of vehicle, which computer system 20 can adjust based on additional inspections of vehicles of the same type and the corresponding profile data 52. In this case, computer system 20 can adjust the standard profile and/or tolerances for deviating from the standard profile based on the profile data acquired over numerous inspections.

Figure 6B:
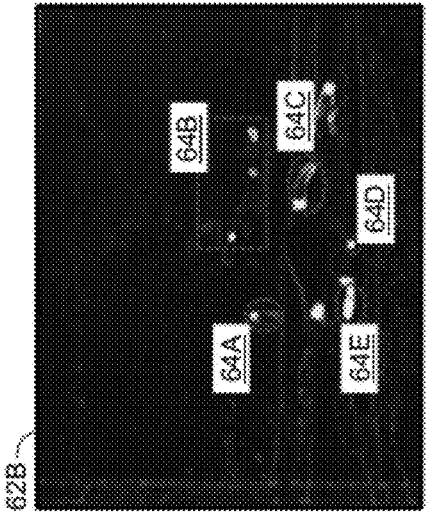
FIGS. 6A-6C show illustrative images of a scene according to an embodiment.
Figure 6A:
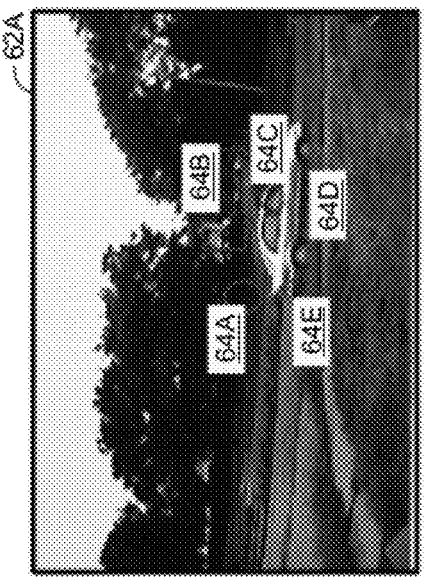
Figure 6C:
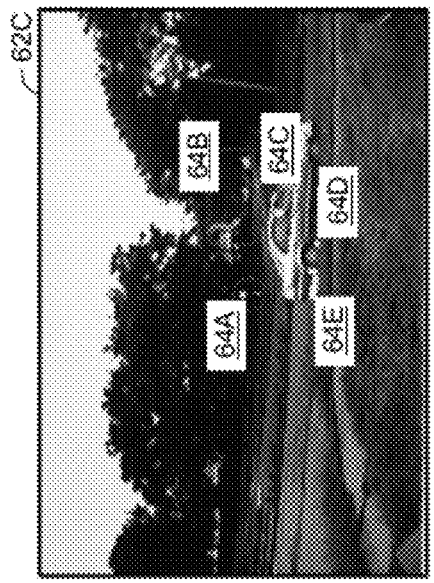

In addition to generating a three-dimensional profile corresponding to portion(s) of a target object, computer system 20 can use sensor/data fusion to construct profile data 52 for one or more additional attributes of the target object, which would not be possible using a single modality. For example, FIGS. 6A-6C show illustrative images 62A-62C, respectively, of a scene according to an embodiment. In particular, image 62A is a visible light image, image 62B is an infrared image (after edge-enhancement), and image 62C is a fused image of images 62A, 62B. Each image 62A-62C includes various areas 64A-64E of potential interest. Area 64A contains a bicyclist, area 64B contains operating construction machinery in the background, area 64C contains an open passenger side window of a vehicle, area 64D contains a portion of the undercarriage of the vehicle, and area 64E contains a portion of the exhaust region of the vehicle.

As illustrated, individually, the visible light image 62A and the infrared image 62B readily provide unique information with respect to the imaged scene. For example, visible light image 62A enables ready identification of the presence of a vehicle parked on a street, as well as trees and other details in the background. These details are difficult to identify in infrared image 62B. However, infrared image 62B shows an object generating heat in area 64A, which is nearly undetectable in image 62A, and heat sources in area 64B, which indicate that the construction machinery dimly visible in image 62A is in operation, generating significant heat. Similarly, while image 62A does not include any visual cues to indicate the current status of the vehicle in the foreground, areas 64D, 64E of image 62B indicate that the vehicle is currently or was recently running (thus the heat from the engine), and area 64C indicates the presence of a person in the driver's seat, which also is almost invisible in image 62A.

Referring to FIGS. 3 and 6A-6C, when images 62A, 62B are acquired concurrently as sensing data 50, and the correspondence of the respective fields of view is known (e.g., through registration of the images), computer system 20 can create fused image 62C by processing images 62A, 62B using any solution. Image 62C contains substantially all of the information available in both images 62A, 62B. In particular, the information provided by image 62A is enhanced with the information regarding the operating statuses of the construction machinery and the vehicle, as well as the presence of the bicyclist and the driver.

Computer system 20 can implement a similar process during a vehicle 2 (FIG. 1) inspection to generate profile data 52, which computer system 20 can analyze to identify any anomalies associated with the vehicle 2. Illustrative anomalies that computer system 20 can identify include the detection of hidden objects or compartments, the detection of flaws or failures in operating components (e.g., brakes or tires), and/or the like. For example, computer system 20 can generate an infrared profile for assembly 2A (FIGS. 4A, 5A) and store the infrared profile as profile data 52 for the corresponding vehicle, which can be used to evaluate surface temperatures and heat radiation from within assembly 2A. Computer system 20 also can generate an infrared profile for assembly 2B (FIGS. 4A, 5A) and compare the infrared profile to stored profile data 52 for assembly 2A and/or assemblies of the same vehicle type and flag any difference (e.g., new heat source, different attributes of a heat source, and/or the like) as an anomaly. Further, computer system 20 can provide the fused image 62C for display to a user, who can analyze the fused image 62C manually.

Returning to FIG. 1, as discussed herein, computer system 20 can process sensing data 50 (FIG. 3) received from one or more sensing devices 30 at sensing assembly 14 to generate a three-dimensional profile 52A corresponding to a portion of the vehicle 2 (e.g., the undercarriage). Computer system 20 can compare profile 52A to expected profile(s) (e.g., standard, previous, etc.) for the portion of vehicle 2 and detect an anomaly 66. Computer system 20 can extract an outline of anomaly 66 from the profile 52A to produce a profile of the anomaly 66. Further, computer system 20 can compare the anomaly profile to a set of templates or other solutions for identifying potential hazards (e.g., providing the anomaly for presentation to a user), to determine whether any action is required in response to the anomaly 66. Should action be required, computer system 20 can implement any combination of various types of actions, including, but not limited to: communicating a query for processing at a monitoring station 70 for a decision as to the appropriate response to the anomaly 66, if any; activating a barrier 72 or other type of traffic control device to prevent the vehicle 2 from proceeding further; providing an alert 74 to a set of alert locations (e.g., supervisory-level individuals), which can be selected based on the type of anomaly 66 and a corresponding severity; and/or the like.

Figure 7:
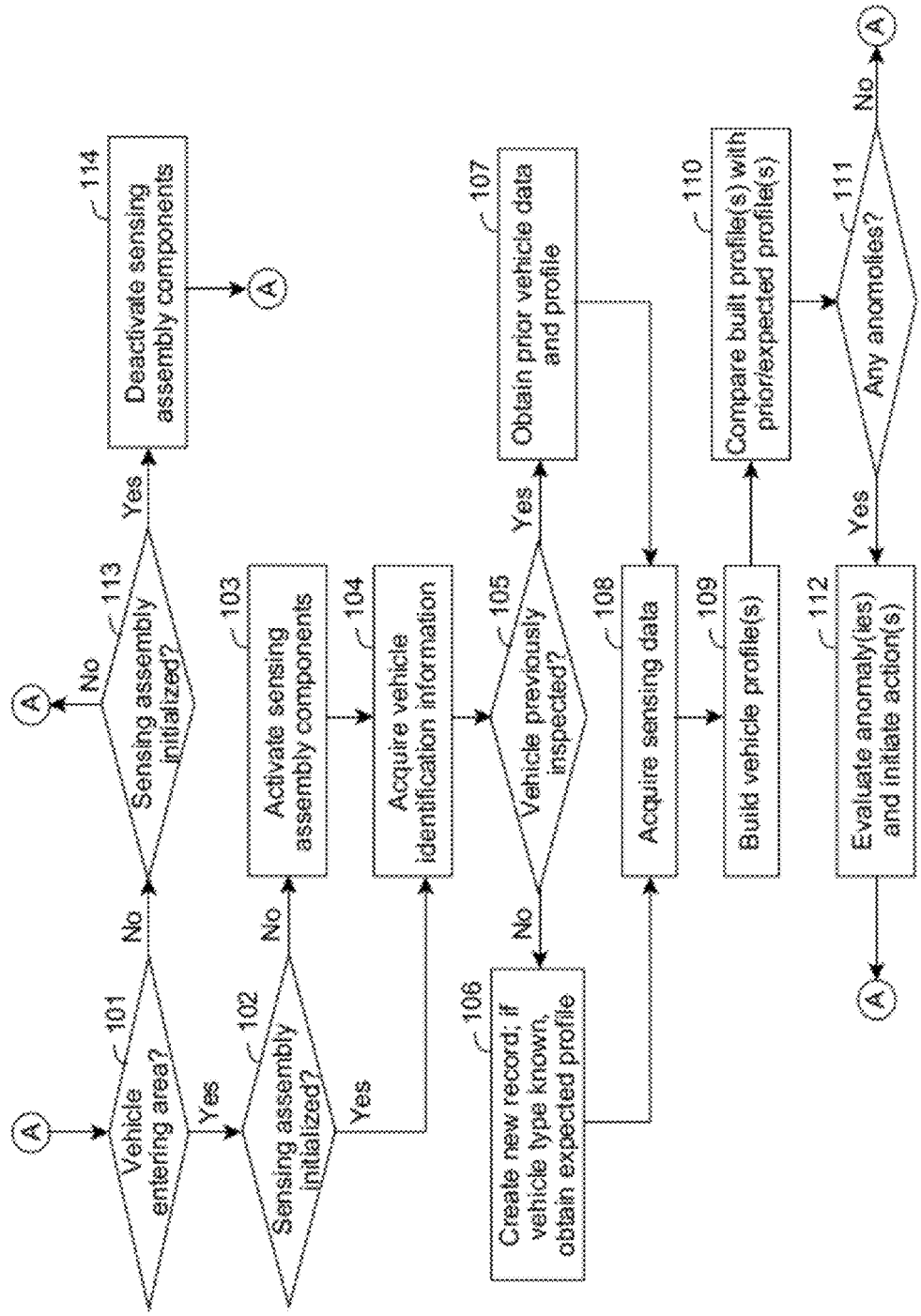
FIG. 7 shows an illustrative flowchart for inspecting a vehicle according to an embodiment.

FIG. 7 shows an illustrative flowchart for inspecting a vehicle according to an embodiment, which can be implemented by computer system 20 (FIG. 1). Referring to FIGS. 1 and 7, in process 101, computer system 20 can receive from vehicle sensor 12 an indication of whether a vehicle 2 is entering an inspection area (e.g., approaching sensing assembly 14). If so, in process 102, computer system 20 can determine whether sensing assembly 14 is initialized and ready to acquire sensing data for inspecting the vehicle 2. If not, in process 103, computer system 20 can activate the various components of sensing assembly 14. For example, using sensing assembly 14 of FIGS. 2A and 2B as an illustrative example, computer system 20 can signal the support electronics 36A-36E of each sensing unit 40A-40E to initialize the remaining components of the corresponding sensing unit 40A-40E. In response, support electronics 36A-36E can open any corresponding shutter(s) 38A-38E, power up processing component 34A-34E, sensing device(s) 30A-30J, emitter(s) 32A-32E, and/or the like.

In process 104, computer system 20 can acquire vehicle identification information for vehicle 2. The vehicle identification data can comprise, for example, data that is capable of uniquely identifying vehicle 2 from other vehicles, such as a license plate state/number, a state/federal vehicle identification code (e.g., department of transportation (DOT) number, Universal Machine Language Equipment Register (UMLER) identifier), a manufacturer's unique identifier (e.g., serial number or vehicle identification number), and/or the like. Further, the vehicle identification data can comprise data that is capable of identifying the type of vehicle 2 that is approaching sensing assembly 14. To this extent, vehicle sensor 12 and/or sensing assembly 14 can include one or more components for acquiring the vehicle identification data using any solution, e.g., imaging device(s), radio frequency identification (RFID) tag reader(s), and/or the like. Additionally, computer system 20 can acquire vehicle identification information for vehicle 2 from an external database, such as a database of known vehicles 2 having scheduled arrivals. Still further, computer system 20 can generate vehicle identification information, e.g., a number of the vehicle/vehicle type inspected for a particular time period, a unique aspect of vehicle 2 (e.g., not conforming to any stored profiles), and/or the like. Regardless, it is understood that the vehicle identification information can include any combination of one or more types of identification information.

In process 105, computer system 20 can determine whether the vehicle 2 identified by the vehicle identification data has been previously inspected. To this extent, computer system 20 can search a database of records to determine if previously obtained profile data 52 for the identified vehicle 2 is present. The records can be acquired by system 10 and/or can be obtained by computer system 20 from inspections performed by other systems/locations. When computer system 20 does not locate a record of a previous inspection of vehicle 2, in process 106, computer system 20 can create a new record in the database, and if the vehicle type for the vehicle 2 is known, obtain a standard profile for one or more portions of vehicle 2 based on the vehicle type. For example, the standard profile can comprise a profile acquired from other vehicle(s) of the same type, a profile generated from a three-dimensional model of the corresponding type of vehicle (e.g., original CAD/CAM drawings or the like). Depending on the frequency and importance of the arrival of a new, unknown type of vehicle, computer system 20 can identify the vehicle 2 as an anomaly and initiate corresponding action(s) (e.g., generate an alert 74) in response. When computer system 20 determines that the identified vehicle 2 has been previously inspected in process 105, in process 107, computer system 20 can obtain profile data 52 from the previous inspection(s) from a database, or the like. Further, computer system 20 can obtain sensing data 50 and/or additional prior data (e.g., date of inspection, speed of vehicle, etc.) corresponding to one or more of the previous inspection(s).

Regardless, in process 108, computer system 20 can acquire sensing data 50 for the vehicle 2. In particular, the various components on sensing assembly 14 can acquire data as the vehicle 2 passes, and transmit the sensing data 50 to computer system 20 for further processing. The transmitted sensing data 50 can comprise raw data acquired by one or more components and/or data that has been pre-processed, e.g., by a processing component 34A-34E (FIG. 2A) of a sensing unit 40A-40E (FIG. 2A). In process 109, computer system 20 can build a profile for each of one or more portions of the vehicle 2 using the sensing data 50. For example, computer system 20 can construct a three-dimensional profile of substantially all of an exterior side of the vehicle 2, such as the undercarriage, of the vehicle 2. Further, computer system 20 can construct a profile for another type of attribute of vehicle 2, such as a heat profile (e.g., using infrared data), a noise profile, a chemical profile, and/or the like.

In process 110, computer system 20 compares the newly constructed profile(s) corresponding to vehicle 2 to the previous and/or standard profiles for vehicle 2. For example, computer system 20 can compare the relative locations of various surfaces, the size, texture, color, contour, etc., of each surface, and/or the like, identified in a three-dimensional profile of a side of vehicle 2 to the corresponding features of the expected profile(s) for vehicle 2. Similarly, computer system 20 can compare other types of profiles, such as a sound profile, an infrared profile, and/or the like.

In process 111, computer system 20 determines whether any anomalies are present in one or more of the newly acquired profile(s) for vehicle 2. For example, computer system 20 can identify an anomaly as an attribute of a three-dimensional profile having a sufficient deviation between the current profile and an expected profile (e.g., component missing, too large, different shape, and/or the like, a new item is present, etc.). To this extent, computer system 20 can utilize any combination of various evaluation approaches, including, but not limited to, an expert system, a neural network, template/pattern matching of potential anomalies, and/or the like, to automatically determine if the deviation may indicate one or more of the anomalies (e.g., template of squealing brakes) and/or provide an identification of the anomaly. Computer system 20 can subsequently store the profile(s) as profile data 52 for the vehicle 2 and/or store the sensing data 50 for the vehicle 2 for later reference and/or use.

When an anomaly is detected in process 111, in process 112, computer system 20 can evaluate the anomaly(ies) and initiate corresponding action(s) based on the evaluation. For example, computer system 20 can utilize a set of user-selectable parameters and conditions to initiate a particular set of actions in response to identifying an anomaly or a type of anomaly associated with a vehicle 2. The actions can include, for example, providing information on the anomaly(ies) for processing at a monitoring station 70; activating a barrier 72 or other type of traffic control device; providing an alert 74 to a set of alert locations (e.g., supervisory-level individuals); and/or the like. Regardless, computer system 20 can store sensing data 50 and/or profile data 52 used to identify the anomaly that initiated an alert condition as an alert record for future use (e.g., evidence in a legal proceeding).

After inspecting a vehicle 2, computer system 20 can return to process 101 to determine whether another vehicle 2 is approaching the inspection area. If not, in process 113, computer system 20 can determine whether the various components of sensing assembly 14 remain initialized. If so, in process 114, computer system 20 can deactivate (e.g., sleep) the various components of sensing assembly 14. For example, using sensing assembly 14 of FIGS. 2A and 2B as an illustrative example, computer system 20 can signal the support electronics 36A-36E of each sensing unit 40A-40E to power down/sleep the remaining components of the corresponding sensing unit 40A-40E. In response, support electronics 36A-36E can close any corresponding shutter(s) 38A-38E, power down processing component 34A-34E, sensing device(s) 30A-30J, emitter(s) 32A-32E, and/or the like. The power down can be done in a manner that enables the various components to re-initialize quickly once a vehicle 2 is identified as approaching sensing assembly 14 (e.g., standby/hibernate).

As discussed herein, computer system 20 can automatically evaluate the profile(s) of a vehicle being inspected using any combination of one or more of various evaluation approaches. For example, computer system 20 can implement an expert system to automatically evaluate the profile(s) of a vehicle 2 being inspected. An expert system can comprise a set of condition examinations and corresponding action events associated with the condition examination(s). To this extent, the expert system can evaluate a question, and based on the answer to the question, take one or more actions. For example, considering a three-dimensional profile of a portion of a vehicle 2, a relevant question can comprise "is the visible portion of component A of the current profile the same height as the visible portion of component A of the expected profile?" In this case, a "no" answer may lead to further evaluation of additional conditional statements regarding the change in height, the extent of the difference, etc., which would enable computer system 20 to determine how significant the change is and whether it warrants stopping the vehicle 2. An expert system may include "fuzzy logic," which assigns probabilities to answers, rather than assigning a yes/no value. In this case, computer system 20 can arrive at a conclusion based on the final probabilities calculated from all applicable cases.

Further, computer system 20 can implement a neural network to automatically evaluate the profile(s) of a vehicle 2 being inspected. A neural network is a logically programmed structure comprising a number of emulated "neural units," which may trigger a reaction based on their own characteristics and on the characteristics of other neural units. The neural network can be trained before deployment using a number of exemplar, target cases. When subsequently deployed, the neural network can formulate a response based on the reactions of the various neural units as a result of the training. To ensure effective performance after deployment, care must be taken to ensure that the training cases are robust and do not include spurious data (e.g., a visible piece of tape used to identify an object for the trainers), which the neural network may utilize to provide good results in training, but poor performance after deployment.

Still further, computer system 20 can utilize template or pattern matching to automatically evaluate the profile(s) of a vehicle 2 being inspected. In this approach, computer system 20 can comprise an extensive set of templates or patterns, each of which has specific discriminable characteristics against which computer system 20 can match the current profile data 52. To ensure effective pattern matching results, a proper level of tolerance must be used to determine when a match is found versus when no match is found. Too much or too little tolerance can result in too many or too few matches being identified.

The evaluation approach(es) implemented by computer system 20 can enable computer system 20 to identify various types of anomalies and conditions. When three-dimensional data and infrared data are acquired for evaluation by computer system 20, these anomalies and conditions can include, but are not limited to: the modification of a structure to allow for hidden compartments; the presence of unknown additional components or objects; changes in color and/or size of a component; anomalous cleanliness/dirtiness of an area (evidencing recent replacement or change); presence of camouflaged objects/individuals hidden from a visual inspection; detection of temperature differentials (e.g., indicating the presence of living beings or operating machinery, overheating brakes or circuitry, hollow areas, liquid levels, or the like); significant temperature differentials in a cargo area of vehicle 2 (e.g. indicating loss of cooling, overheating cargo chemical/biological reactions, fire, and/or the like, unexpected voids within the cargo, etc.). Further, the use of other types of data can enable computer system 20 to identify additional types of anomalies and conditions including, but not limited to, stress/weight evaluation to determine whether the actual vehicle mass corresponds to an expected/declared vehicle mass; hyperspectral imaging (e.g., the comparison of the emissivity/reflectivity of a material in a large number of different narrow spectral bands) to determine a unique "fingerprint" for a particular substance and identify the material; and/or the like.

In an illustrative implementation of system 10, as shown and described herein, the various components of system 10 can be permanently installed on a rail line entering/leaving a secure installation, such as a military base. In this implementation, system 10 can perform security-related inspections of each rail vehicle 2 entering/leaving the secure installation. In addition to security-related inspections of the rail vehicles 2, system 10 can be configured to perform other types of inspections, such as safety and maintenance-related inspections. To this extent, in another implementation, system 10 can be installed at a rail yard, such as a classification yard, to perform safety, maintenance, and/or security-related inspections of rail vehicles 2 entering/leaving the rail yard.

It is understood that numerous alternative implementations of system 10 are possible, in which components of system 10 are utilized to inspect rail and/or non-rail vehicles 2, are implemented in a permanent or temporary manner, and/or the like. For example, an illustrative implementation comprises a portable version of the various components of system 10, which can be placed in relatively unpredictable locations. The portable version of system 10 can include provisions for proper setup, positioning, calibration, and takedown of the various components to ensure reliable performance of the system 10 with the temporary design. Such a system 10 can be utilized to perform safety/security inspections for vehicles on roads, which can enable, for example, reliable special event security to be carried out on any road leading into a temporarily secured area. Additionally, an embodiment of system 10 can include a moveable sensing assembly 14 that can be utilized to inspect one or more stationary objects, such as parked vehicles. In this case, sensing assembly 14 can comprise one or more wheeled assemblies, each of which is moved with respect to the stationary object being inspected by a user and/or computer system 20.

Further, system 10 can perform maintenance-related profiling for a fleet of vehicles, and can provide the vehicle operators/owners with improved information regarding the maintenance of the vehicles, thereby reducing wear and tear and preventing accidents of various types. To this extent, computer system 20 can interact with a health and usage monitoring (HUMS) system, which would permit the owners to perform "predictive maintenance" on the vehicles, offering immense potential for monetary and time savings.

Additionally, while an illustrative embodiment of system 10 shown and described herein includes visible and/or infrared light-based imaging devices and laser line emitters, it is understood that system 10 can be implemented using any combination of various types of sensing devices, with or without corresponding emitting devices. For example, an embodiment of system 10 can use line-scan cameras combined with velocity measurement devices, which can produce full images of a target with less expensive, highly accurate devices. Further, system 10 can include one or more acoustic sensors, which can provide sensing data that computer system 20 can analyze to identify potentially defective brakes or bearings, or other sounds indicating the presence of unusual/unauthorized objects, the absence of usual objects, or the like. Still further, system 10 can comprise an active infrared (heat) source, which emits heat towards at least a portion of vehicle 2 in conjunction with an infrared imaging device. In this case, computer system 20 can analyze the infrared images to identify various attributes of the target object including, for example, a chemical makeup, a physical condition (e.g., the presence of cracks or voids), the presence of compartments, and/or the like. Even further, various other types of sensing/emitting devices can be utilized in system 10 including biological, chemical, x-rays, radar, and the like.

Still further, while aspects of the invention have been described with reference to generating a three-dimensional profile of the undercarriage of a vehicle 2, it is understood that a three-dimensional profile and/or other profiles, such as an infrared profile, can be generated for any combination of the various sides of a vehicle. For example, an embodiment of system 10 can generate a profile for each surface of a vehicle 2, which can enable the detection of modifications to the top of the vehicle, e.g., where individual(s) and/or object(s) may be camouflaged making spotting them by viewing the top of the vehicle difficult. Additionally, while profiles based on visible and/or infrared image data have been shown and described herein, it is understood that computer system 20 can generate, store, and compare profiles based on data acquired using any type of sensing device(s). For example, computer system 20 can generate an acoustic profile, a chemical profile, an x-ray profile, a radar profile, and/or the like, which computer system 20 can analyze to identify any anomalies as described herein.

Aspects of the invention also provide for the inspection of any type of object. The object can comprise three-dimensional features, which when altered, indicate the presence of an anomaly. For example, the object can comprise an assembly that includes multiple components. The features can be on an external surface of the object and/or be on one or more internal surfaces of the object (e.g., interior of a vehicle). An embodiment of the invention can be implemented to inspect individuals, e.g., while entering and/or leaving a secure area. To this extent, similar principles of inspection apply to human bodies as apply to vehicles, although some approaches (e.g., neutron bombardment) are not appropriate for inspecting human bodies. However, the basic principles of profiling and comparing the profile to prior versions remain usable, and can be utilized to provide a flexible alternative to current standard checkpoints.

While shown and described herein as a method and system for inspecting an object, it is understood that aspects of the invention further provide various alternative embodiments. For example, in one embodiment, the invention provides a computer program fixed in at least one computer-readable medium, which when executed, enables a computer system to inspect an object. To this extent, the computer-readable medium includes program code, such as inspection program 42 (FIG. 3), which implements some or all of a process described herein. It is understood that the term "computer-readable medium" comprises one or more of any type of tangible medium of expression, now known or later developed, from which a copy of the program code can be perceived, reproduced, or otherwise communicated by a computing device. For example, the computer-readable medium can comprise: one or more portable storage articles of manufacture; one or more memory/storage components of a computing device; paper; and/or the like.

In another embodiment, the invention provides a method of providing a copy of program code, such as inspection program 42 (FIG. 3), which implements some or all of a process described herein. In this case, a computer system can process a copy of program code that implements some or all of a process described herein to generate and transmit, for reception at a second, distinct location, a set of data signals that has one or more of its characteristics set and/or changed in such a manner as to encode a copy of the program code in the set of data signals. Similarly, an embodiment of the invention provides a method of acquiring a copy of program code that implements some or all of a process described herein, which includes a computer system receiving the set of data signals described herein, and translating the set of data signals into a copy of the computer program fixed in at least one computer-readable medium. In either case, the set of data signals can be transmitted/received using any type of communications link.

In still another embodiment, the invention provides a method of generating a system for inspecting an object. In this case, a computer system, such as computer system 20 (FIG. 1), can be obtained (e.g., created, maintained, made available, etc.) and one or more components for performing a process described herein can be obtained (e.g., created, purchased, used, modified, etc.) and deployed with the computer system to an inspection system 10. To this extent, the deployment can comprise one or more of: (1) installing program code on a computing device; (2) adding one or more computing and/or I/O devices to the environment; (3) incorporating and/or modifying the computer system to enable it to perform a process described herein; and/or the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A computer-implemented method of inspecting a vehicle, the method comprising:
   generating a three-dimensional profile of at least one side of the vehicle based on visible light-based image data for the vehicle using at least one computing device;
   generating a non-visible profile for the vehicle based on non-visible data for the vehicle using the at least one computing device;
   analyzing at least one of: the three-dimensional profile or the non-visible profile to identify any anomalies associated with the vehicle using the at least one computing device, wherein the analyzing analyzes both profiles when no anomalies are identified, the analyzing including at least one of:
      comparing the three-dimensional profile to at least one of: a standard three-dimensional profile corresponding to a type of the vehicle or a previous three-dimensional profile acquired for the vehicle; or
      comparing the non-visible profile to at least one of a standard non-visible profile corresponding to the type of the vehicle or a previous non-visible profile acquired for the vehicle; and
   initiating an action in response to identifying an anomaly associated with the vehicle using the at least one computing device.

2. The method of claim 1, the method further comprising:
   acquiring the visible light-based image data for the vehicle using a set of imaging devices; and
   acquiring the non-visible data for the vehicle using a set of non-visible sensing devices.

3. The method of claim 2, wherein the acquiring the visible light-based image data includes:
   illuminating the at least one side of the vehicle with a pattern of light; and
   acquiring image data for the at least one side of the vehicle concurrently with the illuminating, wherein the acquired image data includes a reflection of at least a portion of the pattern of light.

4. The method of claim 3, wherein the pattern of light comprises at least one of: a line of light, a plurality of lines of light, or a first plurality of substantially parallel and a second plurality of substantially parallel lines substantially perpendicular to the first plurality of substantially lines.

5. The method of claim 2, further comprising detecting a presence of the vehicle using at least one sensing device, wherein the acquiring actions are automatically performed in response to the detecting.

6. The method of claim 5, further comprising automatically activating the set of imaging devices in response to the detecting.

7. The method of claim 1, wherein the non-visible data comprises at least one of: infrared data, acoustic data, or chemical data for the vehicle.

8. The method of claim 1, wherein the at least one side of the vehicle includes an undercarriage of the vehicle.

9. A computer-implemented method of inspecting a vehicle, the method comprising:
   generating a three-dimensional profile of at least one side of the vehicle based on visible light-based image data for the vehicle using at least one computing device;
   fusing infrared data for the vehicle with the image data for the vehicle using the at least one computing device;
   analyzing at least one of: the three-dimensional profile or the fused data to identify any anomalies associated with the vehicle using the at least one computing device, the analyzing the three-dimensional profile including comparing the three-dimensional profile to at least one of: a standard three-dimensional profile corresponding to a type of the vehicle or a previous three-dimensional profile acquired for the vehicle, wherein both the three-dimensional profile and the fused data are analyzed when no anomalies are identified; and
   initiating an action in response to identifying an anomaly associated with the vehicle using the at least one computing device.

10. The method of claim 9, wherein the at least one side of the vehicle includes an undercarriage of the vehicle.

11. A system for inspecting an object, the system comprising:
   a set of visible light-based imaging devices, each imaging device configured to acquire visible light-based image data for the object as the object passes;
   a set of non-visible sensing devices configured to acquire non-visible data for the vehicle; and
   a computer system including at least one computing device in communication with each imaging device and each non-visible sensing device, the computer system configured to inspect the object by performing a method including:
      generating a three-dimensional profile of at least one side of the object using the image data;
      generating at least one non-visible profile corresponding to the object using the non-visible data;
      analyzing at least one of: the three-dimensional profile or at least one non-visible profile to identify any anomalies associated with the object, wherein the analyzing analyzes each of the profiles when no anomalies are identified, the analyzing the three-dimensional profile including comparing the three-dimensional profile to a standard three-dimensional profile corresponding to a type of the object; and
      initiating an action in response to identification of an anomaly associated with the vehicle.

12. The system of claim 11, wherein the set of non-visible sensing devices includes at least one of: an infrared imaging device, an acoustic sensor, or a chemical sensor.

13. The system of claim 11, further comprising a set of emitters, each emitter configured to direct electromagnetic radiation toward the object as the object passes, wherein the image data acquired by an imaging device in the set of imaging devices includes a reflection of at least a portion of the electromagnetic radiation.

14. The system of claim 11, further comprising:
   a sensing device configured to detect a presence of an object moving toward the set of imaging devices; and
   a computing device configured to automatically activate the set of imaging devices in response to the object being detected.

15. The system of claim 11, wherein the object is a vehicle and the at least one side includes an undercarriage of the vehicle.

16. A system for inspecting an object, the system comprising:
- a set of visible light-based imaging devices, each imaging device configured to acquire visible light-based image data for the object as the object passes;
- a set of infrared imaging devices configured to acquire infrared data for the vehicle; and
- a computer system including at least one computing device in communication with each imaging device, the computer system configured to inspect the object by performing a method including:
  - generating a three-dimensional profile of at least one side of the object using the image data;
  - fusing the infrared data with the image data for the vehicle;
  - analyzing at least one of: the three-dimensional profile or the fused data to identify any anomalies associated with the object, the analyzing the three-dimensional profile including comparing the three-dimensional profile to a standard three-dimensional profile corresponding to a type of the object, wherein both the three-dimensional profile and the fused data are analyzed when no anomalies are identified; and
  - initiating an action in response to identification of an anomaly associated with the vehicle.

17. A system for inspecting an object, the system comprising:
- a computer system including at least one computing device, the computer system configured to inspect the object by performing a method including:
  - generating a three-dimensional profile of at least one side of the object using image data corresponding to the object;
  - generating at least one non-visible profile corresponding to the object using non-visible data corresponding to the object; and
  - analyzing at least one of: the three-dimensional profile or at least one non-visible profile to identify any anomalies associated with the object, wherein the analyzing analyzes each of the profiles when no anomalies are identified, the analyzing the three-dimensional profile including comparing the three-dimensional profile to a standard three-dimensional profile corresponding to a type of the object.

18. The system of claim 17, the analyzing the three-dimensional profile further including comparing the three-dimensional profile to a previous three-dimensional profile generated for the at least one side of the object.

19. The system of claim 17, further comprising:
- a set of imaging devices, each imaging device configured to acquire image data for the object as the object passes;
- a set of emitters, each emitter configured to direct electromagnetic radiation toward the object as the object passes, wherein the image data acquired by an imaging device in the set of imaging devices includes a reflection of at least a portion of the electromagnetic radiation;
- a sensing device configured to detect a presence of an object moving toward the set of imaging devices; and
- a computing device configured to activate the set of imaging devices and the set of emitters in response to the object being detected by the sensing device.

20. The system of claim 17, wherein the object is a vehicle and the at least one side includes an undercarriage of the vehicle.

* * * * *